United States Patent
Park et al.

(10) Patent No.: US 11,394,259 B2
(45) Date of Patent: Jul. 19, 2022

(54) ROTOR OF MOTOR HAVING EXPANSION BARRIER IN A ROTOR CORE

(71) Applicants: HYUNDAI MOTOR COMPANY, Seoul (KR); KIA MOTORS CORPORATION, Seoul (KR)

(72) Inventors: Kyung Soo Park, Daejeon (KR); Jung Woo Lee, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 32 days.

(21) Appl. No.: 16/927,092

(22) Filed: Jul. 13, 2020

(65) Prior Publication Data

US 2021/0265881 A1  Aug. 26, 2021

(30) Foreign Application Priority Data

Feb. 24, 2020 (KR) .......................... 10-2020-0021997

(51) Int. Cl.
*H02K 1/27* (2022.01)
*H02K 1/276* (2022.01)

(52) U.S. Cl.
CPC ................................ *H02K 1/2766* (2013.01)

(58) Field of Classification Search
CPC .................. H02K 1/2766; H02K 1/27–1/2793
See application file for complete search history.

(56) References Cited

U.S. PATENT DOCUMENTS

| 8,803,394 B2 | 8/2014 | Sano et al. | |
| 9,775,489 B1 | 10/2017 | Ponkshe et al. | |
| 2013/0119807 A1* | 5/2013 | Nakada | H02K 1/2706 310/156.38 |
| 2015/0188368 A1* | 7/2015 | Moon | H02K 1/2766 310/51 |

* cited by examiner

*Primary Examiner* — Thomas Truong
(74) *Attorney, Agent, or Firm* — Morgan, Lewis & Bockius LLP

(57) ABSTRACT

A rotor of a motor includes: a first slot and a second slot arranged in a "V" shape to each other and a third slot and a fourth slot arranged in a "V" shape to each other; a first permanent magnet and a second permanent magnet disposed in the first slot and the second slot, respectively; and a 1-1 barrier and a 1-2 barrier expandedly disposed on an outer side and an inner side of the first slot, respectively, a 3-1 barrier expandedly disposed on an outer side of the third slot, a 3-2 barrier expandedly disposed on an outer side of the fourth slot, and one 3-3 barrier arranged between an inner side of the third slot and an inner side of the fourth slot.

4 Claims, 5 Drawing Sheets

[FIG. 1]
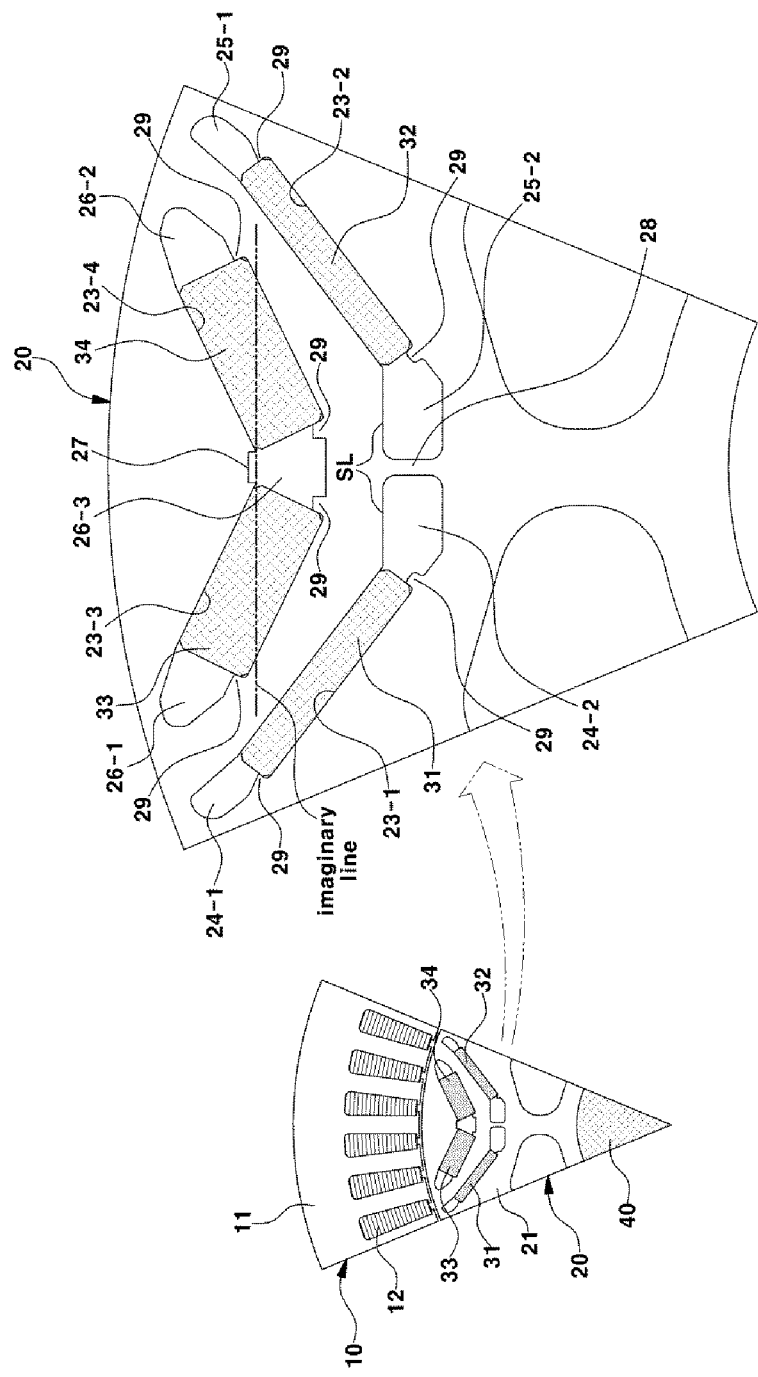

[FIG. 2A]
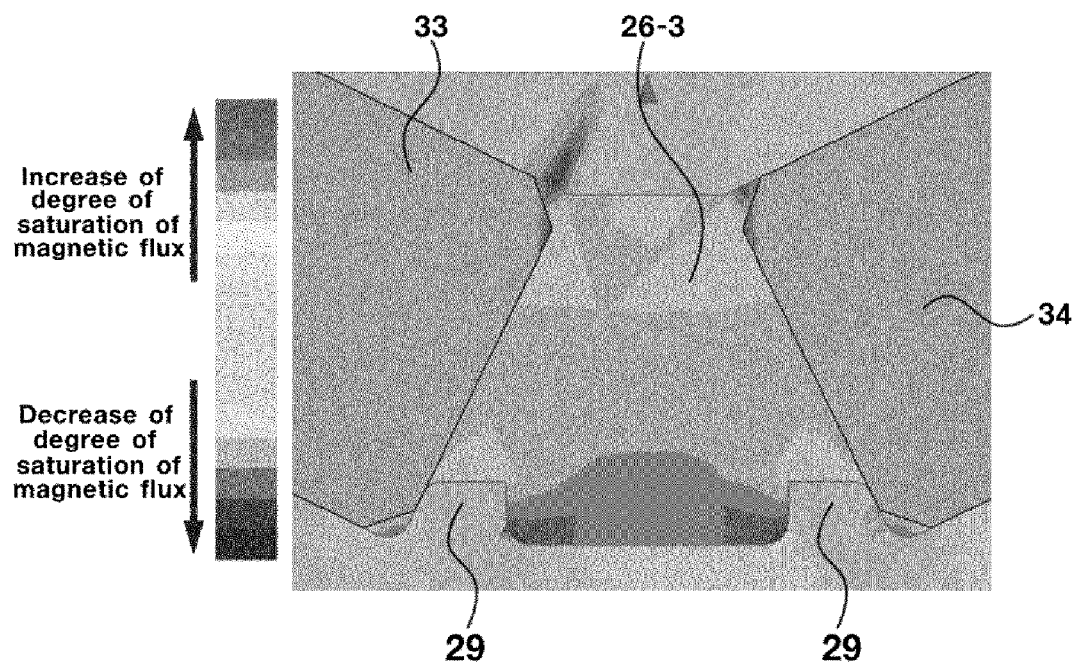

[FIG. 2B]
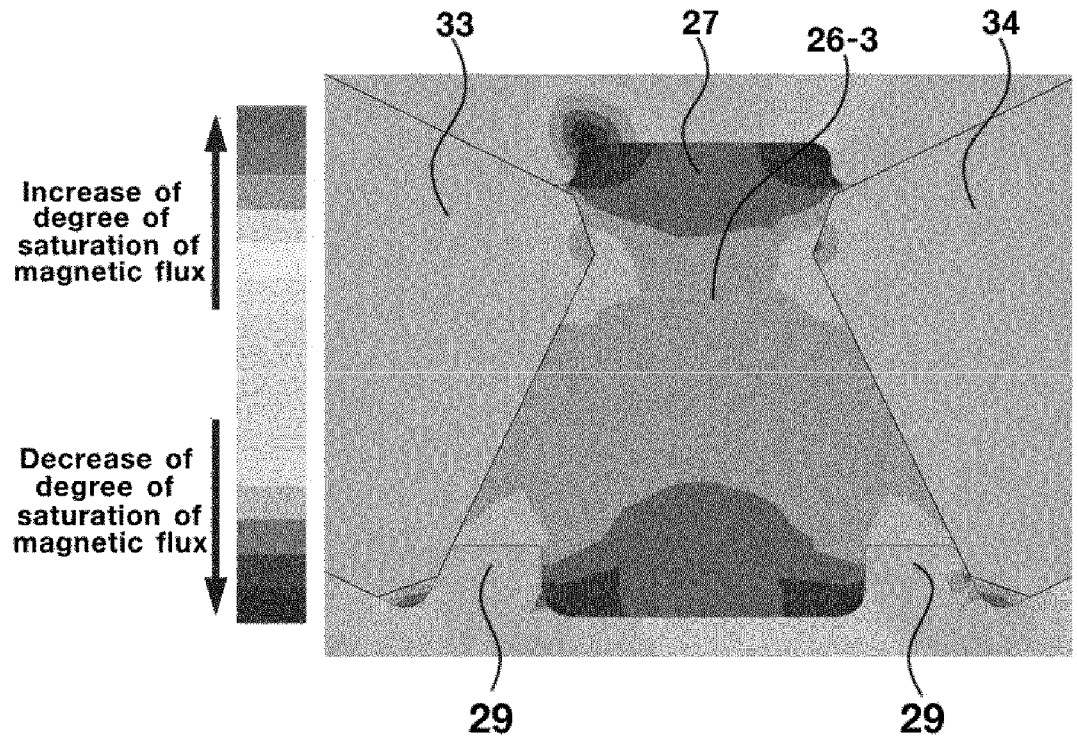
[FIG. 3]
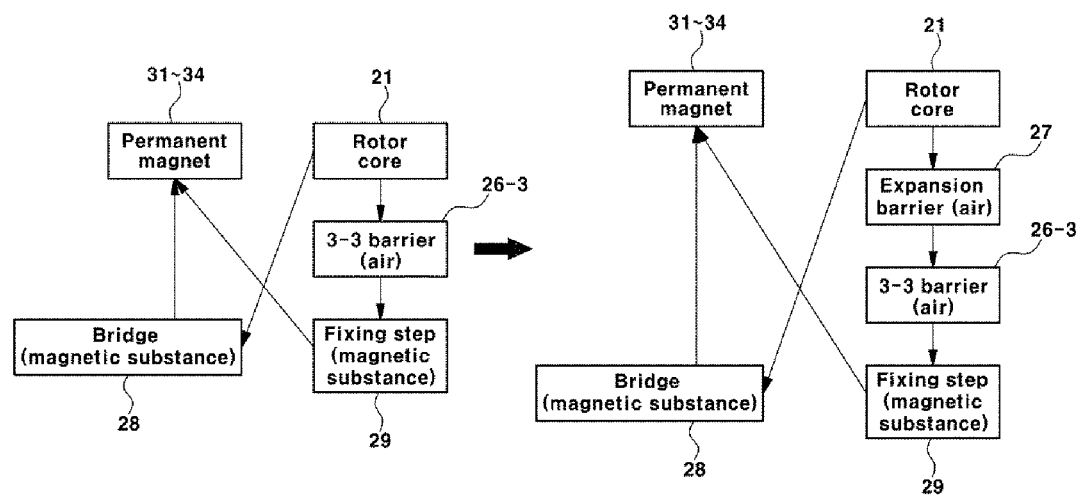

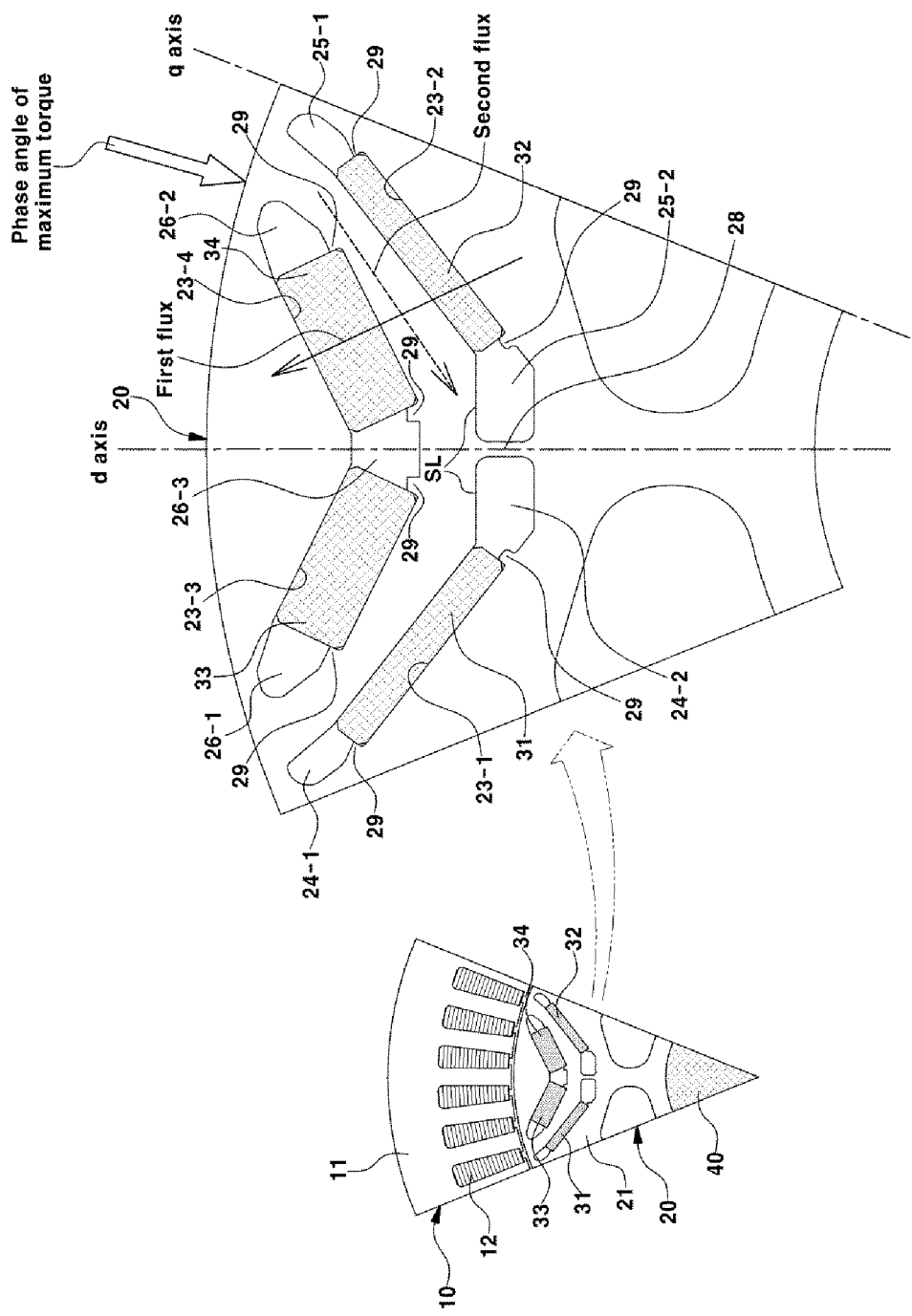
[FIG. 4]

[FIG. 5]
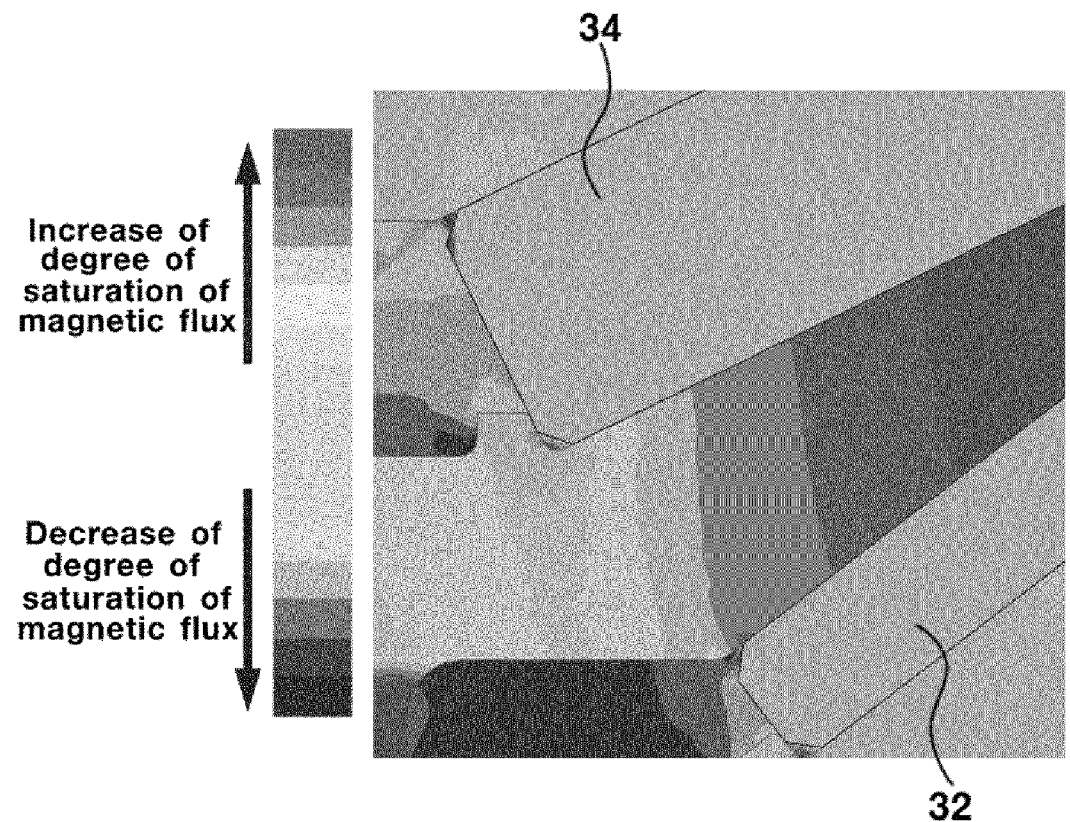

ROTOR OF MOTOR HAVING EXPANSION BARRIER IN A ROTOR CORE

CROSS REFERENCE TO RELATED APPLICATION

The present application claims the benefit of priority to Korean Patent Application No. 10-2020-0021997, filed Feb. 24, 2020 in the Korean Intellectual Property Office, the entire contents of which is incorporated herein by this reference.

TECHNICAL FIELD

The present disclosure relates generally to a rotor of a motor and, more particularly, to a rotor of an interior permanent magnet synchronous motor having an expansion barrier.

BACKGROUND

In general, as a driving motor for eco-friendly vehicles such as hybrid vehicles, electric vehicles, and the like, in accordance with a trend for high power and high efficiency, an interior permanent magnet synchronous motor (IPMSM) in which a permanent magnet is embedded in a rotor is mainly used.

The IPSM is fundamentally configured to include a stator, a rotor disposed at a predetermined interval from an inner surface of the stator, and a plurality of permanent magnets installed in the rotor.

The stator is configured to include a stator core stacked with a plurality of steel sheets and a stator coil wound around the stator core, and the rotor includes a rotor core stacked with a plurality of steel sheets, wherein a shaft of the motor is fixed to an inner surface of the rotor core.

In particular, to install permanent magnets in the rotor core, a plurality of slots is provided on the rotor core along a circumference of the rotor core.

The slot has a length greater than that of the permanent magnet in order to prevent magnetic flux leakage, thereby having a barrier referred to as an empty space which is provided to prevent magnetic flux leakage at each of opposite sides of the slot not occupied by the permanent magnet.

In general, the smaller the size of the barrier, the greater an amount of magnetic flux leakage. However, there is a problem that torque density decreases, thereby causing motor performance to decrease.

On the other hand, in order to compensate for a reduction in torque density, size and usage of the permanent magnet may be increased, but this leads to a problem of an increase in material cost and an increase in motor size.

In addition, the increase in the motor size has a problem in satisfying a design specification which requires a smaller motor so as to be easily mounted in limited vehicle space.

The foregoing is intended merely to aid in the understanding of the background of the present disclosure and is not intended to mean that the present disclosure falls within the purview of the related art that is already known to those skilled in the art.

SUMMARY

The present disclosure has been devised to solve the above problems, and the present disclosure is intended to provide a rotor of a motor capable of increasing leakage reluctance by further providing an expansion barrier for increasing a magnetic flux leakage distance in a rotor core of the motor. Accordingly, together with the above, an effect of magnetic flux leakage prevention due to an increase of the leakage reluctance may be obtained, and an effect of an increase of a motor torque due to the effect of the magnetic flux leakage prevention may be obtained.

According to an aspect of the present disclosure, a rotor of a motor includes: a first slot and a second slot arranged in a "V" shape to each other and a third slot and a fourth slot arranged in a "V" shape to each other, disposed along a circumferential direction of a rotor core; a first permanent magnet and a second permanent magnet inserted and installed in the first slot and the second slot, respectively, a third permanent magnet and a fourth permanent magnet inserted and installed in the third slot and the fourth slot, respectively; and a 1-1 barrier and a 1-2 barrier expandedly disposed on an outer side and an inner side of the first slot, respectively, a 2-1 barrier and a 2-2 barrier expandedly disposed on an outer side and an inner side of the second slot, respectively, a 3-1 barrier expandedly disposed on an outer side of the third slot, a 3-2 barrier expandedly disposed on an outer side of the fourth slot; and one 3-3 barrier arranged between an inner side of the third slot and an inner side of the fourth slot, wherein an expansion barrier convexly expanded toward the outer surface direction of the rotor and defining an empty space is disposed on a top portion of the 3-3 barrier.

The expansion barrier may have a rectangular shape extending toward the outer surface direction of the rotor from a virtual line connecting in a straight line a top end of an inner surface of the third permanent magnet and a top end of an inner surface of the fourth permanent magnet.

The expansion barrier may be configured to increase a magnetic flux leakage distance in the 3-3 barrier where a degree of saturation of magnetic flux is low in the rotor core.

Top ends of the 1-2 barrier and the 2-2 barrier may provide a straight surface (SL), wherein the SL coincides with a virtual line connecting in a straight line an interval between a top end of an inner surface of the first permanent magnet and a top end of an inner surface of the second permanent magnet.

Since a degree of saturation of magnetic flux at an area above the 1-2 barrier and the 2-2 barrier is higher than a degree of saturation of magnetic flux at an area above the 3-3 barrier and the expansion barrier, the top ends of the 1-2 barrier and the 2-2 barrier provide the straight surface (SL) that is not expanded toward the outer surface direction of the rotor core.

Due to the above-described configuration, the present disclosure provides the following effects:

First, by providing an expansion barrier for increasing a magnetic flux leakage distance in a rotor core of the motor, it is possible to increase the leakage reluctance and obtain, at the same time, an effect of magnetic flux leakage prevention due to an increase of the leakage reluctance.

Second, it is possible to obtain an effect of increasing the torque density and efficiency of the motor due to the effect of the magnetic flux leakage prevention.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a partially enlarged sectional view showing an interior permanent magnet synchronous motor according to an exemplary embodiment of the present disclosure;

FIG. 2A shows a degree of saturation of magnetic flux in a state where only a 3-3 barrier is provided in a region between a third permanent magnet and a fourth permanent magnet of a rotor core region of the interior permanent magnet synchronous motor;

FIG. 2B shows a degree of saturation of magnetic flux in a state where an extended barrier is further provided in addition to the 3-3 barrier in a region between the third permanent magnet and the fourth permanent magnet in the rotor core region of the interior permanent magnet synchronous motor;

FIG. 3 shows a magnetic flux leakage path in the state where the only 3-3 barrier is provided in a space between the third permanent magnet and the fourth permanent magnet in the rotor core region of the interior permanent magnet synchronous motor and shows a magnetic flux leakage path in the state where the extended barrier is further provided in addition to the 3-3 barrier in a space between the third permanent magnet and the fourth permanent magnet in the rotor core region of the interior permanent magnet synchronous motor;

FIG. 4 is a partially enlarged sectional view showing a structure of the rotor core of the interior permanent magnet synchronous motor according to a comparative example; and FIG. 5 shows a degree of saturation of magnetic flux in, a region where a first flux from the first and second permanent magnets and a second flux from current are overlapped, and a periphery of the region.

DETAILED DESCRIPTION

Hereinbelow, exemplary embodiments of the present disclosure will be described in detail with reference to the accompanying drawings. Throughout the drawings, the same reference numerals will refer to the same or like parts.

FIG. 1 is a partially enlarged sectional view showing an embodiment of an interior permanent magnet synchronous motor according to an exemplary embodiment of the present disclosure.

As shown in FIG. 1, the interior permanent magnet synchronous motor is fundamentally configured to include a stator 10, a rotor 20 disposed at a predetermined interval from an inner surface of the stator, a plurality of permanent magnets installed in the rotor 20, and the like.

The stator 10 is configured to include a stator core 11 stacked with a plurality of steel sheets and a stator coil 12 wound around the stator core 11.

The rotor 20 includes a rotor core 21 stacked with a plurality of steel sheets, wherein a shaft of the motor is fixed to an inner surface of the rotor core 21.

In particular, the rotor core 21 is provided with a plurality of slot units to install permanent magnets along a circumferential direction thereof by an insertion manner.

More specifically, the slot unit of the rotor core 21 includes a first slot 23-1 and a second slot 23-2, which are arranged in a "V" shape while being symmetrical to each other; and a third slot 23-3 and a fourth slot 23-4, which are arranged in a "V" shape while being symmetrical to each other.

At this time, the first slot 23-1 and the second slot 23-2 are provided in a position biased toward the inner surface of the rotor core 21, and the third slot 23-3 and the fourth slot 23-4 are provided in a position biased toward the outer surface of the rotor core 21, so that the "V" shape provided by the first slot 23-1 and the second slot 23-2 and the "V" shape provided by the third slot 23-3 and the fourth slot 23-4 compose shapes to be stacked and apart from each other at a predetermined distance.

The permanent magnets may be configured to include a first permanent magnet 31 and a second permanent magnet 32, which are to be inserted and installed into the first slot 23-1 and the second slot 23-2, respectively, and a third permanent magnet 33 and a fourth permanent magnet 34, which are to be inserted and installed into the third slot 23-3 and the fourth slot 23-4, respectively.

Since the first slot 23-1 and the second slot 23-2 are arranged in the "V" shape with each other, the first permanent magnet 31 and the second permanent magnet 32 are also arranged in the "V" shape with each other. Similarly, since the third slot 23-3 and the fourth slot 23-4 are arranged in the "V" shape with each other, the third permanent magnet 33 and the fourth permanent magnet 34 are also arranged in the "V" shape with each other.

On the other hand, the first slot 23-1 and the second slot 23-2, and the third slot 23-3 and the fourth slot 23-4 constituting the slot unit are provided in sizes greater than the length of the corresponding permanent magnet to prevent magnetic flux leakage. As shown in FIG. 1, a barrier is provided at each of opposite sides of each of the first to the fourth slots 23-1, 23-2, 23-3, and 23-4, the barrier referring to an empty space that is for preventing magnetic flux leakage while not being occupied by the permanent magnet.

Accordingly, a 1-1 barrier 24-1 and a 1-2 barrier 24-2 are expandedly provided on an outer side and an inner side of the first slot 23-1, respectively, and a 2-1 barrier 25-1 and a 2-2 barrier 25-2 are expandedly provided on an outer side and an inner side of the second slot 23-2, respectively.

In addition, a 3-1 barrier 26-1 is expandedly provided on an outer side of the third slot 23-3, and a 3-2 barrier 26-2 is expandedly provided on an outer side of the fourth slot 23-4, and a 3-3 barrier 26-3, which is one empty space, is provided on an inner side of the third slot 23-3 and an inner side of the fourth slot 23-4.

The 3-3 barrier 26-3 is provided between the third permanent magnet 33 inserted into the third slot 23-3 and the fourth permanent magnet 34 inserted into the fourth slot 23-4.

In particular, an expansion barrier 27 convexly expanded toward the outer surface direction of the rotor and providing an empty space is further provided on a top portion of the 3-3 barrier 26-3.

In other words, the expansion barrier 27 is extendedly provided in a rectangular shape toward the outer surface direction of the rotor from a virtual line connecting in a straight line a top end of a surface of an inner side of the third permanent magnet 33 and a top end of a surface of an inner side of the fourth permanent magnet 34.

A bridge 28 is provided between the 1-2 barrier 24-2 and the 2-2 barrier 25-2 so that the first permanent magnet 31 and the second permanent magnet 32 are located in spaces independent from each other, wherein the bridge 28 functions to reduce an eddy loss due to eddy currents generated in the first permanent magnet 31 and the second permanent magnet 32.

In addition, fixing steps 29 are protrudingly provided at bottom portions of opposite sides of each of the first to the fourth slots 23-1, 23-2, 23-3, and 23-4 in order to fix the corresponding one of the permanent magnets 31, 32, 33, and 34, thereby preventing the permanent magnet from being moved.

FIG. 2A shows a degree of saturation of magnetic flux in a state where only a 3-3 barrier 26-3 is provided between the third permanent magnet 33 and the fourth permanent magnet 34 and the expansion barrier 27 is not provided.

As shown in FIG. 2A, the degree of saturation of the magnetic flux in the 3-3 barrier 26-3 provided between the third permanent magnet 33 and the fourth permanent magnet 34 is low. Therefore, even if the expansion barrier 27 is further provided by being extended toward the outer surface direction of the rotor from the 3-3 barrier 26-3, an effect of a torque reduction due to an increase of the degree of saturation of the magnetic flux is negligibly small. On the contrary, an effect of a torque increase by preventing magnetic flux leakage may be obtained.

FIG. 2B shows a degree of saturation of magnetic flux in a state where the expansion barrier 27 is further provided toward the outer surface direction of the rotor from the 3-3 barrier 26-3 provided between the third permanent magnet 33 and the fourth permanent magnet 34.

As shown in FIG. 2B, the degree of saturation of the magnetic flux in the expansion barrier 27 as well as the degree of saturation of the magnetic flux in the 3-3 barrier 26-3 provided between the third permanent magnet 33 and the fourth permanent magnet 34 is also low. Accordingly, the expansion barrier 27 serves to increase the magnetic flux leakage distance in the 3-3 barrier 26-3.

That is, the expansion barrier 27 serves to increase the magnetic flux leakage distance in the 3-3 barrier 26-3 while providing one empty space communicated with the 3-3 barrier 26-3.

Here, the leakage reluctance R refers to an element that interferes with the flow of magnetic flux and is usually expressed by the following equation.

$$R = l/\mu A \quad \text{(Equation)}$$

In the above equation, l is a magnetic flux leakage distance, $\mu$ is a magnetic permeability, and A is a magnetic flux leakage area.

Accordingly, since the magnetic permeability of air present in the 3-3 barrier 26-3 is very low compared to iron or copper, which is a material of the rotor core, the leakage reluctance R may be increased when the magnetic flux leakage distance l in the 3-3 barrier 26-3 is increased.

Therefore, as the expansion barrier 27 is further expanded from the 3-3 barrier 26-3 as described above, as shown in FIG. 3, the magnetic flux leakage path (length) becomes to increase because the expansion barrier 27 is added in addition to the 3-3 barrier 26-3. Accordingly, the leakage reluctance in the 3-3 barrier 26-3 may be increased, an effect of magnetic flux leakage prevention due to an increase of the leakage reluctance may be obtained, and, as a result, the efficiency of increasing the motor torque due to the effect of the magnetic flux leakage prevention may be obtained.

Comparison Example

FIG. 4 is a partially enlarged sectional view showing a structure without an expansion barrier as a comparison example of an interior permanent magnet synchronous motor.

The interior permanent magnet synchronous motor according to the comparison example is configured to be the same as the embodiment of the present disclosure described above, except only the expansion barrier not being further provided in the rotor core.

As shown in FIG. 4, the interior permanent magnet synchronous motor according to the comparison example is provided only with a 3-3 barrier 26-3, which is an empty space, at an inner side of the third slot 23-3 and an inner side of the fourth slot 23-4.

In other words, only the 3-3 barrier 26-3 is provided without the expansion barrier between the third permanent magnet 33 inserted in the third slot 23-3 and the fourth permanent magnet 34 inserted in the fourth slot 23-4.

In addition, a 1-1 barrier 24-1 and a 1-2 barrier 24-2 are each expandedly provided at an inner side and an outer side of a first slot 23-1 into which the first permanent magnet 31 is inserted, a 2-1 barrier 25-1 and a 2-2 barrier 25-2 are each expandedly provided at an inner side and an outer side of a second slot 23-2 into which the second permanent magnet 32 is inserted.

At this time, top ends of the 1-2 barrier 24-2 and the 2-2 barrier 25-2 provide a straight surface SL, and the straight surface SL coincides with a virtual line connecting in a straight line an interval between the top end of a surface of the inner side of the first permanent magnet 31 and the top end of a surface of the inner side of the inner surface of the second permanent magnet 32.

On the other hand, when a phase angle of maximum torque of the interior permanent magnet synchronous motor is located between zero angle degree (q-axis) and 90 angle degrees (d-axis), for example, as shown in FIG. 4, the first flux coming from the first and second permanent magnets 31 and 32 and the second flux coming from current corresponding to the maximum torque are overlapped. Accordingly, as shown in FIG. 5, a degree of saturation of magnetic flux is increased at an overlapped area and peripheral areas thereof, that is, the areas above the 1-2 barrier 24-2 and the 2-2 barrier 25-2.

Here, when the 1-2 barrier 24-2 and the 2-2 barrier 25-2 are further expanded toward an outer surface direction of the rotor core, leakage reluctance may be increased. However, an increase of magnetic flux reluctance occurs due to a high degree of saturation of the magnetic flux so that an effect of a torque reduction becomes very large. As a result, an effect of magnetic flux leakage prevention due to an increase in the leakage reluctance and an effect of a torque increase cancel each other out.

For a reason as above, the 1-2 barrier 24-2 and the 2-2 barrier 25-2 may not be further expanded toward the outer surface direction of the rotor core, and the expansion barrier may be extendedly provided from the 3-3 barrier 26-3, thereby increasing leakage reluctance in the 3-3 barrier 26-3. Accordingly, the effect of the magnetic flux leakage prevention due to the increase in the leakage reluctance and the effect of the torque increase due to the effect of the magnetic flux leakage prevention may be obtained.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A rotor of a motor, the rotor comprising:
   a first slot and a second slot arranged in a "V" shape to each other and a third slot and a fourth slot arranged in a "V" shape to each other, the first to fourth slots arranged along a circumferential direction of a rotor core;
   a first permanent magnet and a second permanent magnet disposed in the first slot and the second slot, respectively, a third permanent magnet and a fourth permanent magnet inserted and installed in the third slot and the fourth slot, respectively; and a 1-1 barrier and a 1-2 barrier expandedly disposed on an outer side and an inner side of the first slot, respectively, a 2-1 barrier and a 2-2 barrier expandedly disposed on an outer side and an inner side of the second slot, respectively, a 3-1 barrier expandedly disposed on an outer side of the third slot, a 3-2 barrier expandedly disposed on an outer side of the fourth slot, and one 3-3 barrier arranged between an inner side of the third slot and an inner side of the fourth slot, wherein an expansion barrier convexly expanded toward an outer surface direction of the rotor and defining an empty space is disposed on a top portion of the 3-3 barrier, wherein the expansion barrier extends toward the outer surface direction of the rotor from a virtual line connecting in a straight line a top end of an inner surface of the third permanent magnet and a top end of an inner surface of the fourth permanent magnet.

2. The rotor of claim 1, wherein the expansion barrier is configured to increase a magnetic flux leakage distance in the 3-3 barrier where a degree of saturation of magnetic flux is low in the rotor core.

3. The rotor of claim 1, wherein top ends of the 1-2 barrier and the 2-2 barrier provide a straight surface (SL), wherein the SL coincides with a virtual line connecting in a straight line an interval between a top end of an inner surface of the first permanent magnet and a top end of an inner surface of the second permanent magnet.

4. The rotor of claim 3, wherein, a degree of saturation of magnetic flux at an area above the 1-2 barrier and the 2-2 barrier is higher than a degree of saturation of magnetic flux at an area above the 3-3 barrier and the expansion barrier, and the top ends of the 1-2 barrier and the 2-2 barrier provide the straight surface (SL) that is not expanded toward the outer surface direction of the rotor core.

* * * * *